US009256562B1

(12) United States Patent
Sarcar et al.

(10) Patent No.: US 9,256,562 B1
(45) Date of Patent: Feb. 9, 2016

(54) METHOD AND SYSTEM FOR COMMUNICATION BETWEEN A COMPUTING SYSTEM AND A DEVICE

(71) Applicant: QLOGIC, Corporation, Aliso Viejo, CA (US)

(72) Inventors: Kanoj Sarcar, Fremont, CA (US); Madhusudhan Harigovindan Thekkeettil, Bangalore (IN)

(73) Assignee: QLOGIC, Corporation, Aliso Viejo, CA (US)

( * ) Notice: Subject to any disclaimer, the term of this patent is extended or adjusted under 35 U.S.C. 154(b) by 652 days.

(21) Appl. No.: 13/644,535

(22) Filed: Oct. 4, 2012

(51) Int. Cl.
*G06F 12/00* (2006.01)
*G06F 13/40* (2006.01)
*G06F 12/10* (2006.01)
*G06F 12/06* (2006.01)

(52) U.S. Cl.
CPC .......... *G06F 13/4022* (2013.01); *G06F 12/063* (2013.01); *G06F 12/1027* (2013.01)

(58) Field of Classification Search
CPC .......................... G06F 13/4022; G06F 12/1027
See application file for complete search history.

(56) References Cited

U.S. PATENT DOCUMENTS

| 8,868,831 | B2* | 10/2014 | Goyal et al. | 711/118 |
| 2009/0222636 | A1* | 9/2009 | Yano et al. | 711/166 |
| 2012/0144096 | A1* | 6/2012 | Schuette | 711/103 |
| 2014/0205093 | A1* | 7/2014 | Cho et al. | 380/46 |
| 2014/0337284 | A1* | 11/2014 | Orth | 707/610 |

* cited by examiner

*Primary Examiner* — Reginald Bragdon
*Assistant Examiner* — Mehdi Namazi
(74) *Attorney, Agent, or Firm* — Klein, O'Neill & Singh, LLP

(57) ABSTRACT

Machine implemented method and system are provided. A processor for a computing device allocates an address range with an address to write to an intermediate storage location. The processor configures a device communicating with the computing device for writing information at the intermediate storage location and at a plurality of storage locations. The computing device sends the address for the intermediate storage location with data that needs to be written at one of the plurality of storage locations with an identifier identifying the one of the plurality of storage locations; and the device first writes the data at the intermediate storage location and then updates the one of the plurality of storage locations identified by the identifier.

20 Claims, 5 Drawing Sheets

METHOD AND SYSTEM FOR COMMUNICATION BETWEEN A COMPUTING SYSTEM AND A DEVICE

TECHNICAL FIELD

The present invention relates to computing systems and methods of communication thereof.

BACKGROUND

Computing systems are used for various operations. Often computing systems interface with other devices, for example, adapters (network adapters, host bus adapters, converged adapters and others). A computing system may write information at a writable location of an adapter, for example, a writable register. Based on the written information, the adapter may then perform an operation, for example, processing outgoing information, providing status and other operations.

Adapters continue to become powerful and intelligent. They are also using a larger number of registers for receiving information/instructions from the computing system. This presents challenges because often, before information is written to the registers, various translation operations have to be performed. This is not efficient especially when the number of registers continues to increase and a wide address range has to be used. Continuous efforts are being made to improve communication between a computing system and another device.

SUMMARY

The various embodiments of the present system and methods have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description" one will understand how the features of the present embodiments provide various advantages.

In one embodiment, a machine implemented method is provided. The method includes a processor for a computing device allocating an address range with an address to write to an intermediate storage location. The processor configures a device communicating with the computing device for writing information at the intermediate storage location and at a plurality of storage locations. The computing device sends the address for the intermediate storage location with data that needs to be written at one of the plurality of storage locations with an identifier identifying the one of the plurality of storage locations; and the device first writes the data at the intermediate storage location and then updates the one of the plurality of storage locations identified by the identifier.

In another embodiment, a system is provided. The system includes a processor for a computing device communicating with a device via an interconnect, where the device includes an intermediate storage location and a plurality of storage locations for storing data from the processor. The processor allocates an address range with an address to write to the intermediate storage location; configures the device for writing information at the intermediate storage location and at the plurality of storage locations; and sends the address for the intermediate storage location with data that needs to be written at one of the plurality of storage locations with an identifier identifying the one of the plurality of storage locations. The device first writes the data at the intermediate storage location and then updates the one of the plurality of storage locations identified by the identifier.

In yet another embodiment, a device is provided. The device includes an intermediate storage location and a plurality of storage locations for storing data from a processor for a computing device communicating with the device via an interconnect. The processor allocates an address range with an address to write to the intermediate storage location; configures the device for writing information at the intermediate storage location and at the plurality of storage locations; and sends the address for the intermediate storage location with data that needs to be written at one of the plurality of storage locations with an identifier identifying the one of the plurality of storage locations. The device first writes the data at the intermediate storage location and then updates the one of the plurality of storage locations identified by the identifier.

This brief summary has been provided so that the nature of the disclosure may be understood quickly. A more complete understanding of the disclosure can be obtained by reference to the following detailed description of the embodiments thereof concerning the attached drawings.

BRIEF DESCRIPTION OF THE DRAWINGS

The various present embodiments relating to selectable initialization for adapters now will be discussed in detail with an emphasis on highlighting the advantageous features. These novel and non-obvious embodiments are depicted in the accompanying drawings, which are for illustrative purposes only. These drawings include the following figures, in which like numerals indicate like parts.

DETAILED DESCRIPTION

Figure 1A:
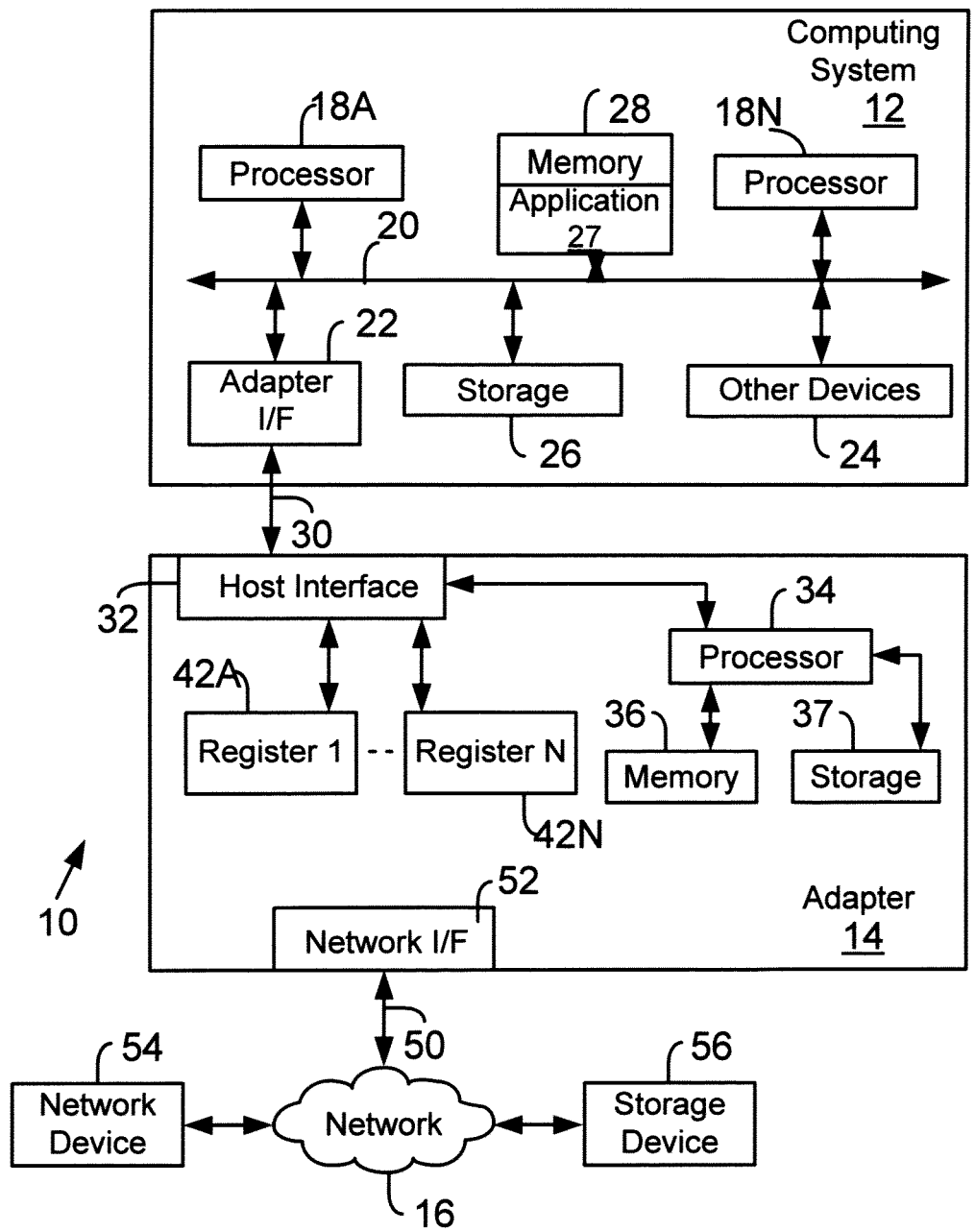
FIG. 1A is a functional block diagram of a computing system coupled to an adapter, used according to one embodiment.

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic", "module", "component", "system", and "functionality", as used herein, generally represent software, firmware, hardware, or a combination of these elements. For instance, in the case of a software implementation, the terms "logic", "module", "component", "system", and "functionality" represent program code that performs specified tasks when executed on a hardware processing device or devices (e.g., CPU or CPUs). The program code can be stored in one or more non-transitory computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of non-transitory storage medium for retaining information in any form, including various kinds of storage devices (magnetic, optical, static, etc.).

The embodiments disclosed herein, may be implemented as a computer process (method), a computing system, or as an article of manufacture, such as a computer program product or computer-readable media. The computer program product may be non-transitory computer storage media, readable by a computer device, and encoding a computer program of instructions for executing a computer process.

FIG. 1A is a block diagram of a system 10 configured for use with the present embodiments. System 10 includes a computing system 12 (may also be referred to as "host system 12") coupled to another device, for example, an adapter 14 that may interface with a network 16. The network 16 may include, for example, additional computing systems, servers, storage systems and other devices.

As an example, adapter 14 may be a network interface card, a host bus adapter, a converged adapter that can process both network and storage protocols and any other device type. QLogic Corp., the assignee of this application provides examples of adapter 14.

The computing system 12 may include one or more processors 18A-18N (may be referred to as processor 18 or processors 18), also known as a central processing unit (CPU). Processor 18 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices.

Processor 18 executes computer-executable process steps and interfaces with an interconnect 20, may also be referred to as a computer bus 20. The computer bus 20 may be, for example, a system bus, a Peripheral Component Interconnect (PCI) bus (or PCI Express bus), a HyperTransport or industry standard architecture (ISA) bus, a SCSI bus, a universal serial bus (USB), an Institute of Electrical and Electronics Engineers (IEEE) standard 1394 bus (sometimes referred to as "Firewire"), or any other interconnect type.

An adapter interface 22 facilitates the ability of the computing system 12 to interface with adapter 14, as described below. The computing system 12 also includes other devices and interfaces 24, which may include a display device interface, a keyboard interface, a pointing device interface and others. The details of these components are not germane to the inventive embodiments.

The computing system 12 may further include a storage device 26, which may be for example a hard disk, a CD-ROM, a non-volatile memory device (flash or memory stick) or any other device. Storage device 26 may store operating system program files, application program files, and other files. Some of these files are stored on storage 26 using an installation program. For example, the processor 18 may execute computer-executable process steps of an installation program so that the processor 18 can properly execute the application program.

Memory 28 also interfaces to the computer bus 20 to provide the processor 18 with access to memory storage. Memory 28 may include random access main memory (RAM). When executing stored computer-executable process steps from storage 26, the processor 18 may store and execute the process steps out of RAM. Read only memory (ROM, not shown) may also be used to store invariant instruction sequences, such as start-up instruction sequences or basic input/output system (BIOS) sequences for operation of a keyboard (not shown).

Memory 28 may include or store an application 27 that may be used to issue commands for performing certain operations, for example, sending information to another device or computing system. Memory 28 may also store utility programs (not shown) that may be used to configure adapter 14 components.

With continued reference to FIG. 1A, a link 30 and the adapter interface 22 couple the adapter 14 to the computing system 12. The adapter 14 may be configured to handle both network and storage traffic. Various network and storage protocols may be used to handle network and storage traffic, for example, Ethernet, Fibre Channel, Fibre Channel over Ethernet, InfiniBand, Remote Direct Memory Access (RDMA), iSCSI and others.

The adapter 14 interfaces with the computing system 12 via the link 30 and a host interface 32. In one embodiment, the host interface 32 may be a Peripheral Component Interconnect (PCI) Express interface coupled to a PCI Express link 30. The adapter 14 may also include a processor 34 that executes firmware instructions out of memory 36 to control overall adapter 14 operations.

The adapter 14 may also include storage 37, which may be, for example, non-volatile memory, such as flash memory, or any other device. The storage 37 may store executable instructions and operating parameters that can be used for controlling adapter operations.

The adapter 14 includes a network interface 52 that interfaces with a link 50 via one or more ports (not shown). The network interface 52 includes logic and circuitry to receive information via the link 52 and pass it to either the network module 42 or the storage module 46.

Adapter 14 may also include a plurality of writeable registers 42A-42N. These registers may be used to store instructions from processor 18 to perform certain functions, for example, process data, initiate an input/output operation or any other operation type.

In conventional systems, the following describes the process for writing to one of registers 42A-42N: Processor 18 executing instructions, for example, operating system code (62, FIG. 1C) or basic input/output instructions (BIOS), typically assigns a memory mapped input output (MMIO) address range (for example "P") for registers 42A-42N. A logical address range (or virtual address range "V") is then assigned for the MMIO address range P. Operating system 62 or device driver 64 (FIG. 1C) use an address V1 within the virtual address range V to write data. Based on V1, processor 18 generates a physical MMIO address P1 within the MMIO address range P. The MMIO physical address P1 is then provided to adapter interface 22 that initiates the actual register access and sends the address P1 with the data that is to be written at the register to host interface 22. As an example, adapter 22 generates a PCIe address when PCIe is used as an inter-connect.

Host interface 32 decodes the register address and then data is placed at the appropriate register. One can see that there are various translations involved in this process, for example, from V to P. The translations become cumbersome when the address range for registers 42A-42N becomes large. The embodiments described herein provide a solution whereby one can reduce the number of translations and the address range for writing instructions for adapter 14, as described below in detail with respect to FIGS. 1B, 10 and 2A-2B.

Figure 1B:
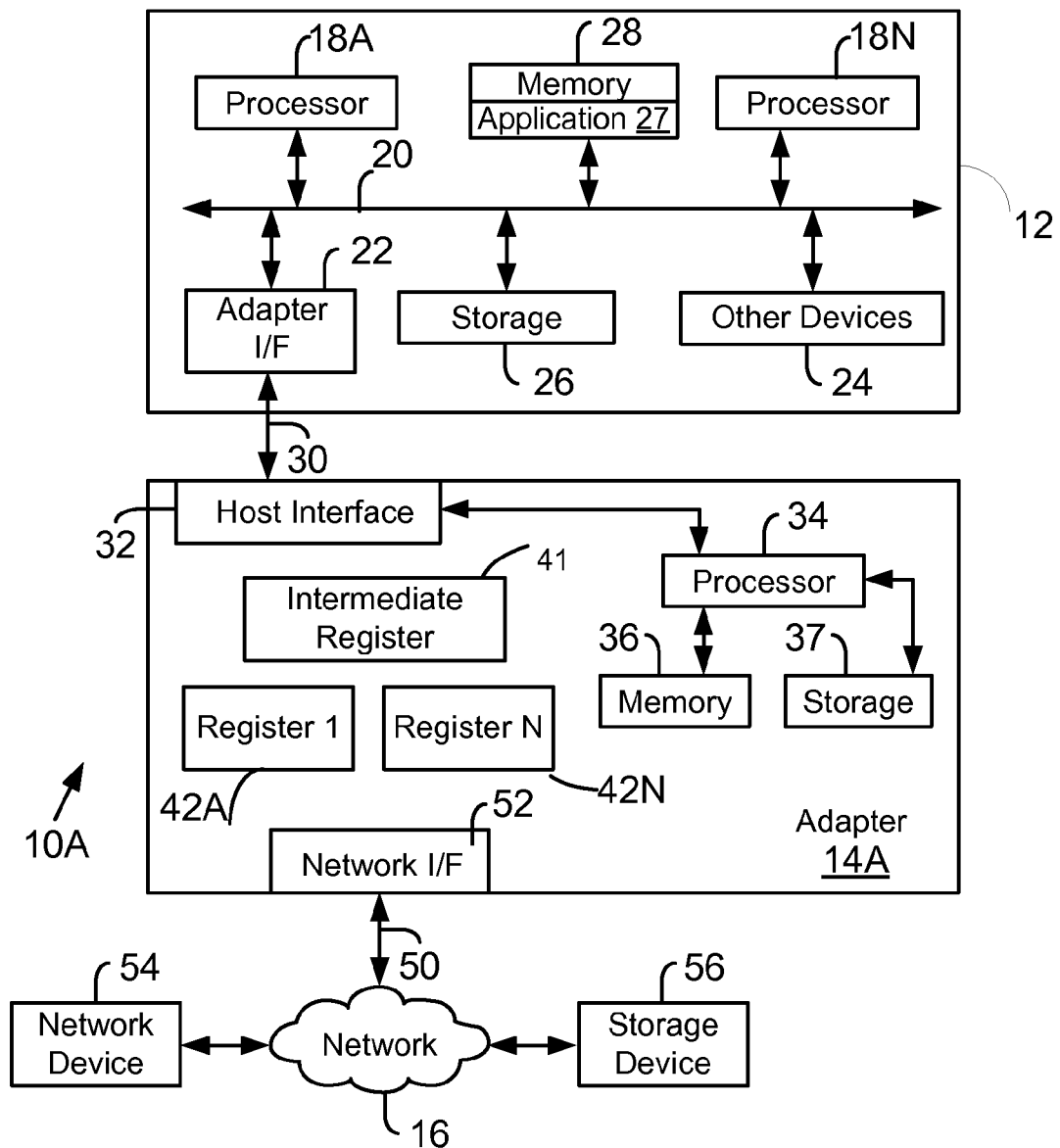
FIG. 1B shows a block diagram of an adapter, according to one embodiment.

FIG. 1B shows an example of system 10A using an adapter 14A, according to one embodiment. In system 10A, instead of having to translate an address range for registers 42A-42N as described above with respect to FIG. 1A, an intermediate register 41 (may also be referred to as a wild card register) is used in adapter 14A for writing to registers 42A-42N, as described below in detail with respect to FIGS. 2A-2B.

Figure 1C:
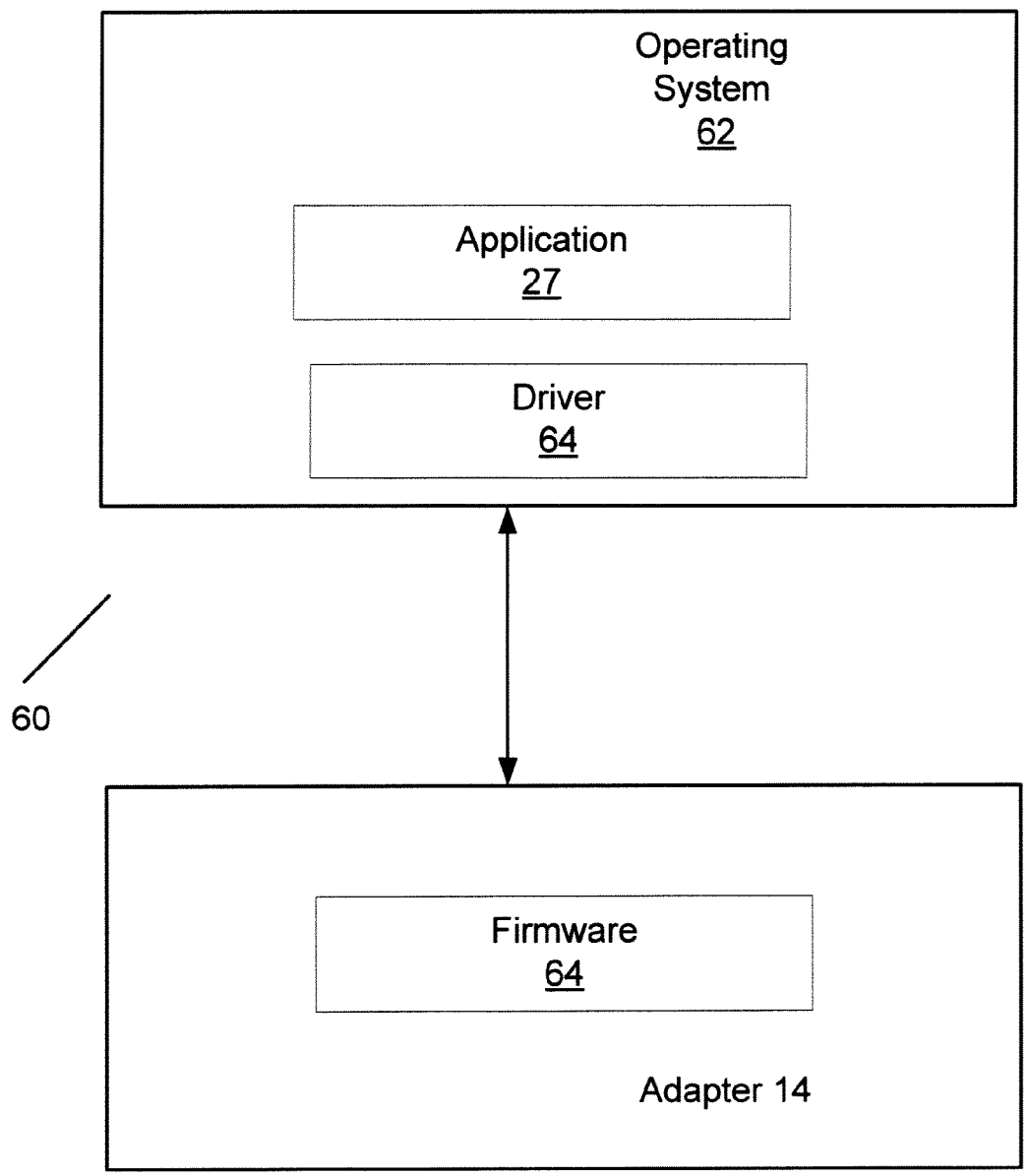
FIG. 1C shows an example of a software architecture used by the system of FIG. 1B.

FIG. 1C shows a block diagram of the software architecture 60, used according to one embodiment. An operating system 62 is executed by processor 18 for controlling the overall operations of computing system 12. Operating system 62 may be a Windows based, Linux based, Solaris or any other operating system type. The embodiments disclosed herein are not limited to any particular operating system type. Processor 18 also executes a driver 64 for interfacing with adapter 14. Firmware 66 is executed by processor 34 of adapter 14 for controlling the overall operations of adapter 14.

Figure 2A:
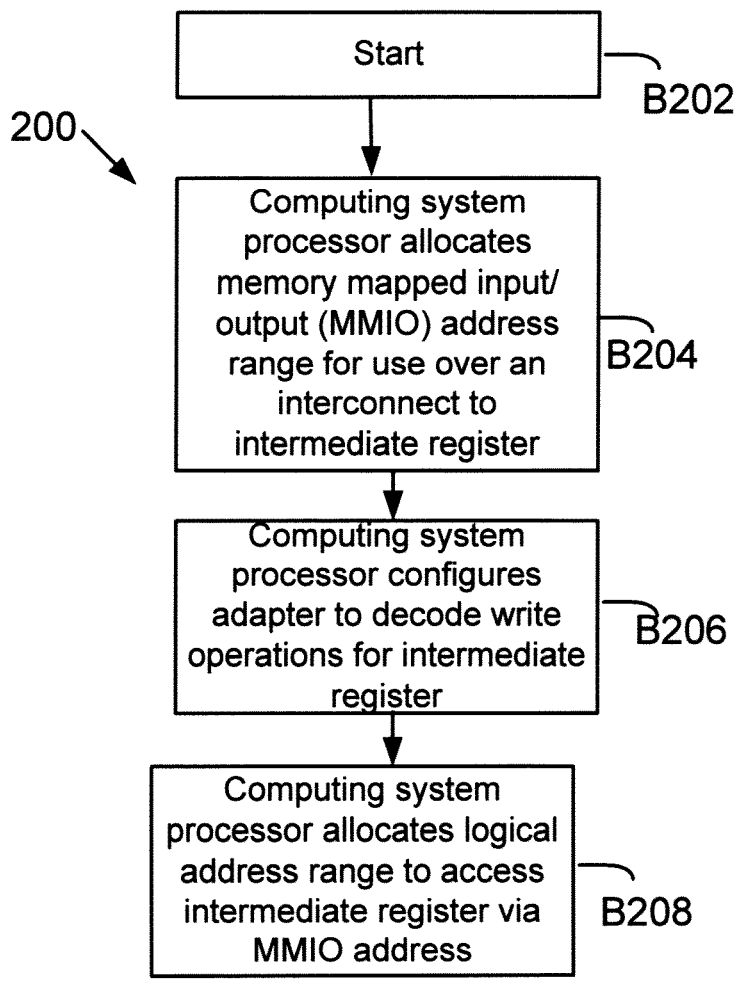
FIGS. 2A-2B show process flow diagrams for using the system of FIG. 1B, according to one embodiment.

FIG. 2A shows a process 200 for configuring adapter 14A for using intermediate register 41, according to one embodiment. The process begins in block B202, when computing system 12 and adapter 14A are initialized. In block B204, operating system 62 or device driver 64 first allocates the MMIO address range P to access registers of adapter 14A via the inter-connect 30. The address range includes a physical address, for example, P2 for the intermediate register 41, which allows data to be written to intermediate register 41 as described below in detail.

In block B206, operating system 62 or device driver 64 configures adapter 14A such that adapter 14A can decode any writes within the assigned MMIO address range that are received from processor 18 via adapter interface 22. The writes are directed to intermediate register 41 but include data that is to be written to one of the registers 42A-42N and include an identifier value for register 42A-42N, as described below in detail.

In block B208, operating system 62 or device driver 64 allocates a logical address (for example, V2) to write to intermediate register 41. Thereafter, adapter 14A is ready for operation. Address V2 once assigned is used by operating system 62 or driver 64 to access register 41. Processor 18 will send the MMIO address P2 as part of translating logical address V2 and adapter interface 22 will then pass on the MMIO address P2 over the interconnect 30 to access register 41, as described below in detail.

Figure 2B:
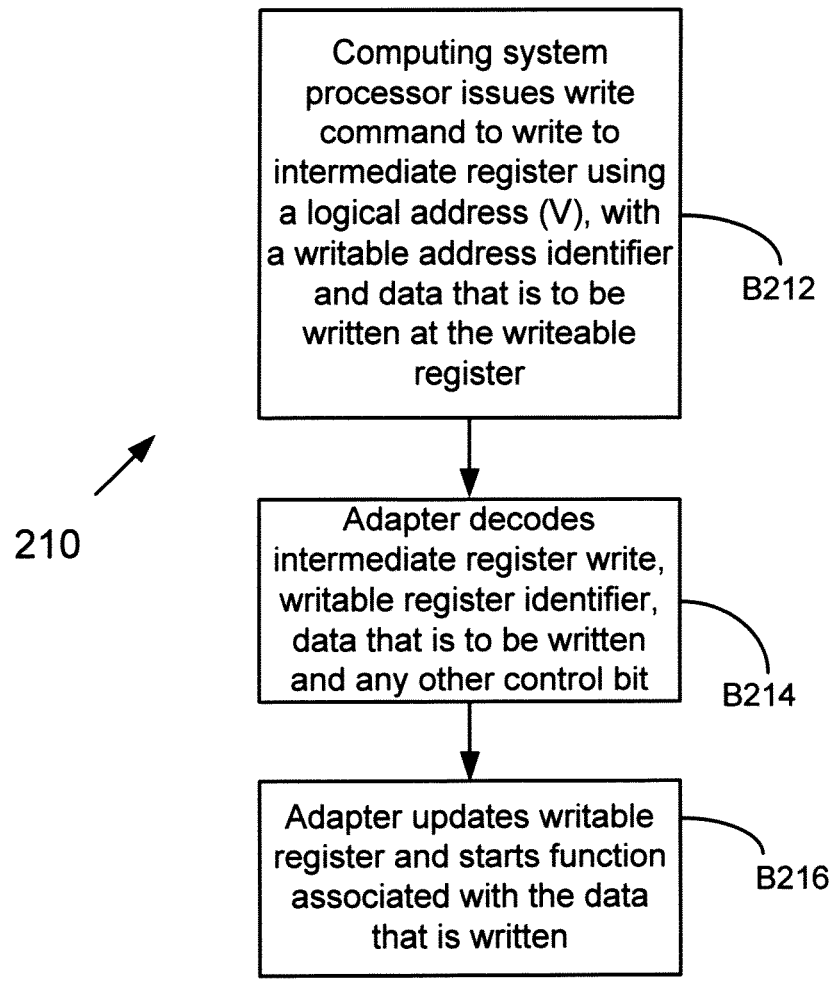

FIG. 2B shows a process 200 for using intermediate register 41, according to one embodiment. The process begins in block B212, when application 27 or any other processor executable code issues instructions to write information at intermediate register 41. Processor 18 receives a virtual address, for example, V2 from application 27. Processor 18 then uses V2 to generate the MMIO address P2 that was configured in block B208, described above. Adapter interface 22 uses this to format the PCIe message to access intermediate register 41. Application 27 also provides the data to write to register 41, which is an identifier for one of the registers 42A-42N along with the data that is meant for one of registers 42A-42N. It is noteworthy that no host system managed locks are needed to write to intermediate register 41, even when more than one processor is issuing writes.

In block B214, the host interface 32 decodes the PCIe address P2 for intermediate register 41, the identifier for register 42A-42N and the data that needs to be written at one of registers 42A-42N.

In block B216, host interface 32 (or any other hardware component) writes to the register that is identified by the register identifier. Thereafter, a function associated with the written data/instruction is executed.

The following provides an example for executing an operation using intermediate register 41. The operation in this example is to obtain status regarding an I/O operation.

Application 27 provides processor 18 with logical address V2 to access register 41 and a data value to write to register 41 with a reference to register R1 (42A) and a command "Provide Status". Processor 18 then determines the physical address P2 associated with V2 to access register 41. Address P2 is then passed to adapter interface 22 with application 27 provided data value. Adapter interface 22 formats a PCIE message with the address P2 and the provided data value and sends the PCIe message on to interconnect 30.

Host interface 32 decodes the address P2 and infers a write operation to write to register 41. Host interface 32 decodes the write value in the format expected for writes to register 41, namely a register identifier and a write value for the identified register 42A. Thus, it detects the attempt to update register 42A with "Provide Status" command and executes this action.

The embodiments disclosed herein have various advantages over conventional system. For example, to write to a plurality of registers one does not need to translate a wide range of addresses corresponding to the plurality of registers. Instead, only an address range for the intermediate register is used in conjunction with an identifier for each of the plurality of registers. This improves communication between a host computing system and another device, for example, an adapter.

Although the present disclosure has been described with reference to specific embodiments, these embodiments are illustrative only and not limiting. Many other applications and embodiments of the present invention will be apparent in light of this disclosure and the following claims. References throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the invention, as will be recognized by those of ordinary skill in the art.

What is claimed is:
1. A machine implemented method, comprising:
a processor for a computing device allocating an address range with a physical address to write to an intermediate storage location at a device communicating with the computing device;
the processor assigning a plurality of identifiers to a plurality of storage locations at the device other than the intermediate storage location, where each of the plurality of storage locations is assigned one of the plurality of identifiers and the address range of the intermediate storage location is smaller than an address range for the plurality of storage locations;
the processor configuring the device communicating with the computing device for writing information at the intermediate storage location of the device and at the plurality of storage locations;
the computing device sending the address for the intermediate storage location with a write value;

an interface of the device decoding the write value to write the data that needs to be written at one of the plurality of storage locations a first identifier identifying the one of the plurality of storage locations; and the device first writing the data at the intermediate storage location and then updating the one of the plurality of storage locations identified by the first identifier.

2. The method of claim 1, wherein the processor receives a virtual address corresponding to the intermediate storage location, translates the virtual address to the physical address of the intermediate storage location and provides the physical address to a device interface.

3. The method of claim 2, wherein the device interface uses the physical address to generate a message for the device to write to the intermediate storage location.

4. The method of claim 3, wherein the device interface is a PCI-Express interface.

5. The method of claim 1, wherein the intermediate storage location is an intermediate register that is addressable using a PCI-Express address.

6. The method of claim 1, wherein the plurality of storage locations are a plurality of writable registers used for storing instructions from the processor of the computing device.

7. The method of claim 1, wherein the device is a network adapter.

8. The method of claim 1, wherein the device is a host bus adapter.

9. The method of claim 1, wherein the device is a converged network adapter.

10. A system, comprising:
a processor for a computing device communicating with a device via an interconnect, where the device includes an intermediate storage location and a plurality of storage locations for storing data received from the processor;

wherein the processor assigns a plurality of identifiers to a plurality of storage locations, each of the plurality of storage locations being assigned one of the plurality of identifiers;

wherein the processor allocates an address range with a physical address to write to the intermediate storage location; configures the device for writing information to any of the plurality of storage locations by using the intermediate storage location; and sends the physical address for the intermediate storage location with a write value;

wherein the address range of the intermediate storage location is smaller than an address range for the plurality of storage locations;

wherein an interface for the device decodes the write value to write data that needs to be written at one of the plurality of storage locations with a first identifier identifying the one of the plurality of storage locations; and wherein the device first writes the data at the intermediate storage location and then updates the one of the plurality of storage locations identified by the first identifier.

11. The system of claim 10, wherein the processor receives a virtual address corresponding to the intermediate storage location, translates the virtual address to the physical address of the intermediate storage location and provides the address to a device interface.

12. The system of claim 11, wherein the device interface uses the physical address to generate a message for the device to write to the intermediate storage location.

13. The system of claim 12, wherein the device interface is a PCI-Express interface.

14. The system of claim 10, wherein the intermediate storage location is an intermediate register that is addressable using a PCI-Express address.

15. The system of claim 10, wherein the plurality of storage locations are a plurality of writable registers used for storing instructions from the processor of the computing device.

16. The system of claim 10, wherein the device includes a network adapter, a host bus adapter and a converged network adapter.

17. A device, comprising:
an intermediate storage location and a plurality of storage locations for storing data from a processor for a computing device communicating with the device via an interconnect;

wherein the processor assigns a plurality of identifiers to the plurality of storage locations, each of the plurality of storage locations being assigned one of the plurality of identifiers;

wherein the processor allocates an address range with a physical address to write to the intermediate storage location; configures the device for writing information to any of the plurality of storage locations by using the intermediate storage location; and sends, from the computing device, the address for the intermediate storage location with a write value;

wherein the address range of the intermediate storage location is smaller than an address range for the plurality of storage locations;

wherein the device decodes the write value to write data that needs to be written at one of the plurality of storage locations with a first identifier identifying the one of the plurality of storage locations; and wherein the device first writes the data at the intermediate storage location and then updates the one of the plurality of storage locations identified by the first identifier.

18. The device of claim 17, wherein the processor receives a virtual address corresponding to the intermediate storage location, translates the virtual address to the physical address of the intermediate storage location and provides the address to a device interface.

19. The device of claim 17, wherein the intermediate storage location is an intermediate register that is addressable using a PCI-Express address.

20. The device of claim 17, wherein the device includes a network adapter, a host bus adapter and a converged network adapter.

* * * * *